(12) United States Patent
Grünberg et al.

(10) Patent No.: US 10,984,947 B2
(45) Date of Patent: Apr. 20, 2021

(54) CONTACTLESS INDUCTIVE ENERGY TRANSMISSION DEVICE AND METHOD

(71) Applicant: Weidmüller Interface GmbH & Co. KG, Detmold (DE)

(72) Inventors: Olaf Grünberg, Blomberg (DE); Marc Neu, Kalletal (DE)

(73) Assignee: Weidmüller Interface GmbH & Co. KG

(*) Notice: Subject to any disclaimer, the term of this patent is extended or adjusted under 35 U.S.C. 154(b) by 0 days.

(21) Appl. No.: 16/338,040

(22) PCT Filed: Oct. 5, 2017

(86) PCT No.: PCT/EP2017/075324
§ 371 (c)(1),
(2) Date: Apr. 25, 2019

(87) PCT Pub. No.: WO2018/069136
PCT Pub. Date: Apr. 19, 2018

(65) Prior Publication Data
US 2020/0143981 A1    May 7, 2020

(30) Foreign Application Priority Data

Oct. 10, 2016  (DE) .................... 10 2016 119 213.9
Jan. 31, 2017  (DE) .................... 10 2017 101 891.3

(51) Int. Cl.
*H01F 38/14*   (2006.01)
*H02J 50/10*   (2016.01)
*G02B 6/24*    (2006.01)
*H04B 5/00*    (2006.01)

(52) U.S. Cl.
CPC ............... *H01F 38/14* (2013.01); *G02B 6/24* (2013.01); *H02J 50/10* (2016.02); *H04B 5/0031* (2013.01); *H04B 5/0037* (2013.01)

(58) Field of Classification Search
CPC . H01F 38/14; H02J 50/10; G02B 6/24; H04B 5/0031; H04B 5/0037
See application file for complete search history.

(56) References Cited

U.S. PATENT DOCUMENTS

| | | | |
|---|---|---|---|
| RE31,524 E | 2/1984 | Hoebel | |
| 4,472,052 A * | 9/1984 | Lofgren | ................ H04B 10/25 |
| | | | 250/227.11 |
| 5,734,254 A | 3/1998 | Stephens | |
| 6,476,520 B1 * | 11/2002 | Bohm | ..................... H01F 38/14 |
| | | | 307/104 |
| 8,437,639 B2 * | 5/2013 | Labonville | ............... B25J 13/02 |
| | | | 250/551 |

(Continued)

FOREIGN PATENT DOCUMENTS

| | | |
|---|---|---|
| CN | 103003130 | 3/2013 |
| DE | 2752783 | 1/1979 |

(Continued)

*Primary Examiner* — Carlos Amaya
(74) *Attorney, Agent, or Firm* — Laubscher & Laubscher, P.C.

(57) ABSTRACT

A contactless inductive energy transmission device includes a primary and a secondary each having at least one coil. The coils are inductively coupled via an air gap. The primary and the secondary each also have a data transmission unit for the transmission of data via the air gap.

6 Claims, 4 Drawing Sheets

(56) References Cited

U.S. PATENT DOCUMENTS

2012/0175969 A1* 7/2012 Maughan ............... H01F 38/14
                                                                  307/104
2013/0114964 A1   5/2013 Paral

FOREIGN PATENT DOCUMENTS

| DE | 4344071 A1 | 7/1995 |
|----|---|---|
| DE | 1775864 A1 | 4/2007 |
| DE | 102009019994 A1 | 12/2009 |
| DE | 102012212254 B2 | 1/2014 |
| DE | 102013213247 A1 | 1/2015 |
| DE | 102014118066 A1 | 6/2016 |
| WO | 2013000644 A1 | 1/2013 |

* cited by examiner

Section A-A

CONTACTLESS INDUCTIVE ENERGY TRANSMISSION DEVICE AND METHOD

This application is based on PCT EP2017/075324 filed Oct. 5, 2017 which claims priority of DE 10 2016 119 213.9 filed Oct. 10, 2016 and DE 10 2017 101 891.3 filed Jan. 31, 2017/The entire contents of these applications are incorporated herein by reference.

BACKGROUND OF THE INVENTION

The invention relates to a device for contactless inductive energy transmission from a primary portion to a secondary portion, each having at least one coil, which can be inductively coupled to one another via an air gap. The invention further relates to an operating method for a device for contactless inductive energy transmission from the coil of a primary portion to the coil of a secondary portion.

In contrast to connectors in which energy is transmitted via mechanically connected or disconnected contact elements, devices for contactless energy transmission benefit with regard to wear due to a high number of mating cycles or strong vibrations. In addition, contact erosion is prevented when plugging and unplugging with respect to an electrical load. The danger of arcs forming when disconnecting connectors with a high current load is also not present with contactless devices for energy transmission. Finally, the contactless transmission of energy provides galvanic isolation between the primary and secondary portions, which can be required in medical applications, for example. The absence of mechanically, intricately interlocking contacts also makes it possible to design the device with surfaces that are as smooth as possible, which makes the contactless energy transmission devices suitable for applications with increased cleanliness and hygiene requirements, for example in the food industry.

In particular, the high wear resistance also makes contactless inductive energy transmission suitable for the automation sector, for example for the transmission of energy to an interchangeable tool of a robot.

International publication WO 2013/087676 A2 describes a device for contactless inductive energy transmission from a primary to a secondary which can replace a mechanical connector for energy transmission, for example to an interchangeable tool of a robot. The primary and secondary portions each have at least one coil which can be inductively coupled to the primary and secondary portions and which each interacts with a ferrite core. Due to its permeability, the ferrite core increases the magnetic flux such that a high quantity of electrical power can be transmitted even with small device sizes and small transmission areas.

The high magnetic flux makes energy transmission possible even when the primary and secondary portions are not yet in a position where the distance between them is minimal, but when there is a gap between them. Energy transmission can also take place with a certain lateral offset of the primary and secondary portions, i.e. if the coils of the primary and secondary portions are not on the same axis.

SUMMARY OF THE INVENTION

It is an object of the present invention to extend the application possibilities of such a device for contactless energy transmission, especially for use in automation.

A device of the type mentioned above is characterized by the fact that the primary portion and the secondary portion each have a data transmission unit for transmitting data via the air gap. Especially when used in the automation sector in an industrial environment, a data connection is often required in addition to the supply current, e.g. for the interchangeable tool of a robot arm. The transmission of power and data together through a single device with only one primary and one secondary portion simplifies setup and maintenance of the device.

In a preferred embodiment of the device, the data is transmitted optically via the air gap. Thus, a data transmission channel is selected which does not interfere with the inductive energy transmission in any situation.

The data transmission units are preferably arranged centrally and concentrically relative to the coils. The space in the middle of the coils can be used to integrate the data transmission units into the primary or secondary portion without increasing their dimensions compared to systems used only for power transmission.

In a further embodiment of the device, the data transmission units each have at least one transmitting element and at least one receiving element. The transmitting element is preferably centrally arranged and surrounded by several receiving elements.

According to another embodiment of the device, the data transmission units each have one light-conducting element. Preferably, this element is mainly cylindrical in shape and has a first light entry or exit surface facing the transmitting or receiving elements and a second light entry or exit surface facing the air gap. The first light entry or exit surface and/or the second light entry or exit surface are planar, concave or convex in shape. The light-conducting elements support the efficiency of the transmission and enable transmission even in the presence of a lateral offset and/or a distance variation between the primary and secondary portions. In addition, the coil center has limited installation space. The light-conducting element can be cylindrical with a diameter that fits snugly into the center of the coil. A larger installation space is then available outside the coil for the transmitting element and the receiving element. The first light entry and exit surface is planar and the second light entry and exit surface concave in design, which is particularly advantageous with regard to compensating for lateral offset.

An operating method for a device for contactless inductive energy transmission from a coil of a primary portion to a coil of a secondary portion via an air gap is characterized such that, during inductive energy transmission from the primary portion to the secondary portion, optical transmission of data between the primary portion and the secondary portion takes place via the air gap by means of data transmission units integrated in the primary portion and the secondary portion. The transmission is preferably bidirectional in a half or full duplex process. This results in the advantages in connection with the device described above.

BRIEF DESCRIPTION OF THE FIGURES

The invention will be described in more detail below with reference to the accompanying drawing, in which.

DETAILED DESCRIPTION

Figures 1, 2:
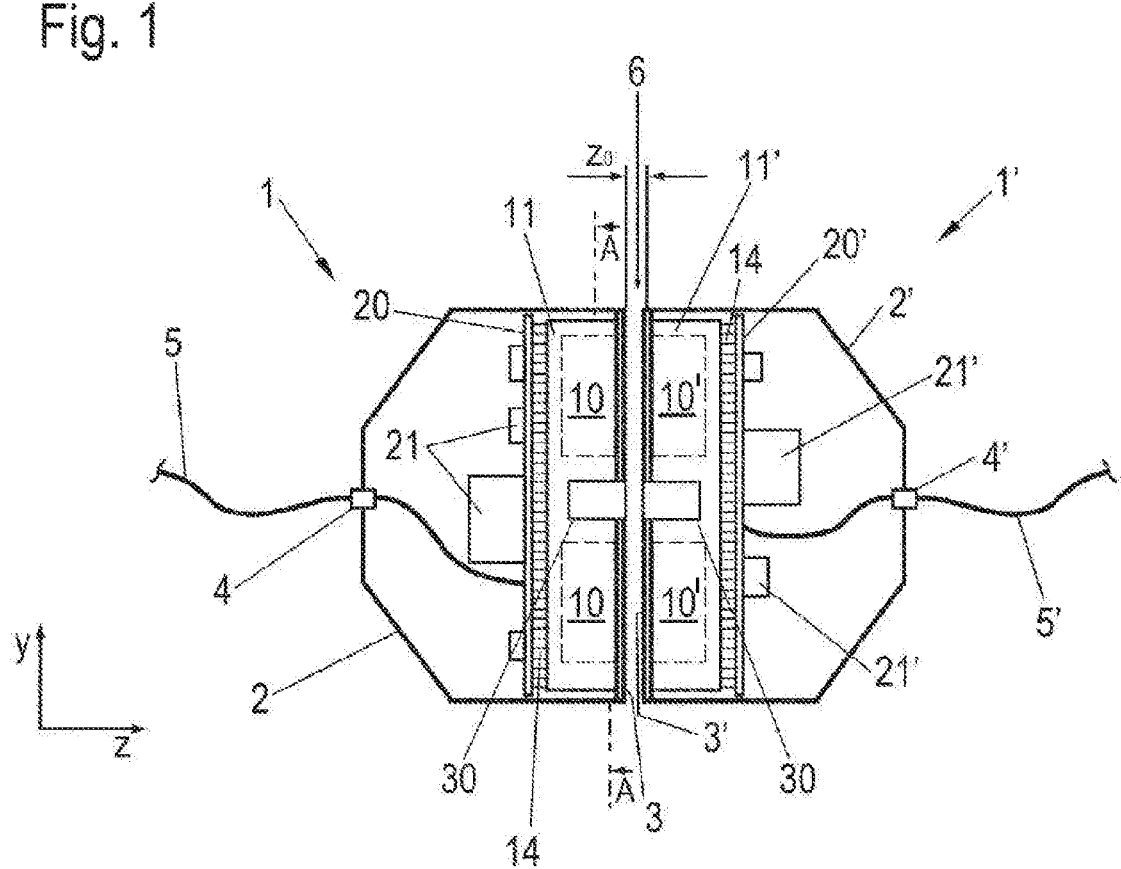
FIG. 1 is a sectional view of a device for contactless energy transmission according to the invention.
FIG. 2 is a sectional view of the device of FIG. 1 taken along line A-A.

FIG. 1 is a schematic sectional view of a device for contactless energy transmission from a primary portion 1 to a secondary portion 1' in accordance with the invention. In FIG. 2, the primary portion 1 is illustrated in a section along the section line A-A displayed in FIG. 1.

In this description and in the drawing, elements which are assigned to primary portion 1, also called primary elements below, bear reference numerals without apostrophe in the figures. Elements assigned to secondary portion 1, also called secondary elements below, bear reference numerals with a corresponding apostrophe, whereby primary and secondary elements which have the same or a comparable function are provided with reference numerals with the same numbers. If the following does not explicitly refer to the primary or secondary side, reference numerals without an apostrophe are used that refer to both sides.

Primary portion 1 and secondary portion 1 each have a housing 2, which can be made of a material usual for connector housings such as plastic, aluminum or stainless steel or the like. The housings 2 are half-shell-shaped, whereby their front side is closed with a front panel 3. In the rear area, pointing away from the front panel 3, a cable entry 4 for a connection cable 5 is fitted in the housing 2. The connection cable 5 is preferably a hybrid line, which incorporates connection lines for energy supply, including the energy to be transmitted, as well as data lines. Alternatively, energy and data can also be supplied in separate lines. Instead of fixed lines, connectors can also be arranged on housing 2.

Directly behind the front panel 3 is a coil 10, which is wound on a ferrite core 11, or is wound on a coil body inserted in the ferrite core 11. The coil 10 can be wound with a single conductor. However, to reduce the skin effect, the use of multi-core high-frequency wires is preferred.

In the preferred embodiment, the ferrite core 11 on the primary and secondary side is a round cup core with an outer edge 12 and an associated concentric inner dome or cylinder 13. Such core is also called a cylindrical E-core. The cross-sections of the outer edge 12 and the inner dome 13 are preferably approximately the same size in order to achieve a homogeneous magnetic flux density taking into account the different stray fields in the ferrite core 11. The use of ferrite cores with different geometries is also possible. For example, square or rectangular cores with round or square or rectangular ferrite cores can be used. Coils without coil bodies, e.g. with conductors glued together, can also be used.

The ferrite cores 11 are open on the side of the respective front panel 3, whereas on the opposite side, the outer edge 12 and the inner dome 13 are connected by a cup bottom. The coil 10 is inserted into the annular groove between the outer edge 12 and the inner dome 13. Any remaining gap between the outer and inner edge of the coil 10 and the ferrite core 11 can be filled with a thermally conductive medium.

During operation, primary portion 1 and secondary portion 1' with their front panels 3, 3' are brought close together and facing each other for contactless inductive energy transmission. In FIG. 1, this distance, which forms an air gap 6, is the transmission distance $z_0$. The size of a reliable transmission distance $z_o$ ranges from 0 to a few millimeters or centimeters, depending on the size, especially the diameter of the coils 10 or ferrite cores 11. The direction along the axis of the coil 10 on the primary side is subsequently referred to as the z-direction, the assigned axis as the z-axis. The x and y directions or axes run perpendicular to the z-axis at the level of the front panel 3.

During operation, an alternating current is applied to the coil 10 on the primary side, also referred to below as primary coil 10. A resonance circuit formed by the primary coil 10 and a resonance capacitor, whose frequency lies in the range from a few kilohertz (kHz) to several hundred kHz, with a frequency in the range of a few tens of kHz being particularly preferred. The alternating current applied to the primary coil 10 is provided by an inverter. For example, a pulse width modulation (PWM) method can be used in the inverter to generate the alternating voltage. Together with monitoring and control devices, the inverter is located on a circuit board 20 inside the housing 2 of the primary portion 1. The drawing shows examples of electronic components 21 on the circuit board 20. In order to protect the inverter against a resonance increase of the amplitude on the resonance circuit, formed by the above-mentioned resonance capacitor and the primary coil 10, the resonance circuit is operated at slightly excessive resonance levels, i.e. at frequencies above the resonance frequency.

During an energy transmission, the magnetic coupling between the primary coil 10 and the secondary coil 10', referred to as the secondary coil 10' below, is particularly efficient due to the ferrite cores 11 and 11'. In the secondary coil 10', a voltage is induced. After rectification, voltage—and voltage stabilization, if necessary—is converted to output voltage at the connection cable 5' for delivery of the transmitted energy. The electronic components on the secondary side are also arranged on a circuit board 20', where individual electronic components 21' are again shown as examples. The secondary coil can be advantageously equipped with a center tap, so that a synchronous rectifier can be used.

In both primary portion 1 and secondary portion 1', heat conducting elements, e.g. heat conducting mats 14, can be arranged between the respective ferrite core 11 and the circuit board 20. Especially on the primary side, but also on the secondary side, the electronic components 21 arranged on the circuit board 20 represent a source of loss in the transmission path. The heat loss generated by these components 21 is transferred to the ferrite core 11 via the heat conducting mats 14. During operation, this heats the ferrite core 11 to a higher operating temperature than would be the case without the thermal coupling to circuit board 20.

If ferrite materials suitable for ferrite cores 11 are used, the losses at lower temperatures in the ferrite core 11 are greater than at higher temperatures over a wide frequency and magnetization range. The previously described input of the energy dissipation of the electronic components as heat into the ferrite core 11 increases its temperature and consequently lowers the energy dissipation in the ferrite core 11 caused by re-magnetization processes. This improves the overall efficiency of the transmission system. This effect can be used both on the primary side and on the secondary side. At the same time, the existing ferrite core 11, 11' is used as a heat sink for the electronic components 21, 21' due to the thermal coupling, which results in additional material and cost savings. Instead of the heat conducting mats 14, for example, a casting compound can also be used to thermally couple the circuit board 20 and the ferrite core 11.

In the preferred embodiment, no interlocking guide or positioning elements are provided which would align the primary portion 1 and the secondary portion 1' laterally to each other when joined together. Due to the absence of such elements, the primary portion 1 and the secondary portion 1' can also be brought into the operating position or separated from each other by a lateral movement, i.e. a movement in the x and/or y direction. This proves to be particularly advantageous in the field of automation, as an additional axial movement of primary and secondary portions 1, 1' towards each other is not required to establish or disconnect a connection. Depending on the intended application, however, such guide or positioning elements may also be provided in alternative embodiments.

The ferrite cores 11, 11' permit a high magnetic flux density, which allows efficient energy transmission even with small coil volumes. The transmission is relatively tolerant towards a lateral displacement of the primary portion 1 and the secondary portion 1' from each other. This is of great advantage in the automation sector, as high positioning accuracy for establishing a conventional contact-based connector can be dispensed with.

In accordance with the application, the primary portion 1 and the secondary portion 1' of the device for contactless energy transmission have integrated data transmission units 30 and 30' respectively, which transmit digital data bi-directionally between the primary portion 1 and the secondary portion 1'. This means that the device for contactless energy transmission can not only supply for example an automation component with power but also with data. The device for contactless energy transmission thus provides important interfaces such as for an interchangeable tool in a combined and contactless manner.

The data transmission units 30 or 30' are preferably identical, so that the data can be transmitted bi-directionally without a preferred direction. The transmission is preferably optical with at least one transmitting element and at least one receiving element in each of the data transmission units 30 or 30'. In the preferred embodiment, the data transmission units 30 or 30' are arranged centrally in the x-direction and y-direction and with a light entry or exit surface preferably in the plane of the cover plate 3, 3'.

A bi-directional transmission can take place in a full duplex procedure, for example, by using light of different wavelengths for the two transmission directions. Even with the same wavelength for both transmission directions, a full duplex procedure can be carried out with the aid of differently modulated signals in both transmission directions. Alternatively, bi-directional transmission is also possible in a half-duplex method, for example by using a time multiplexed method with alternating consecutive time slots for the two transmission directions.

Figure 3:
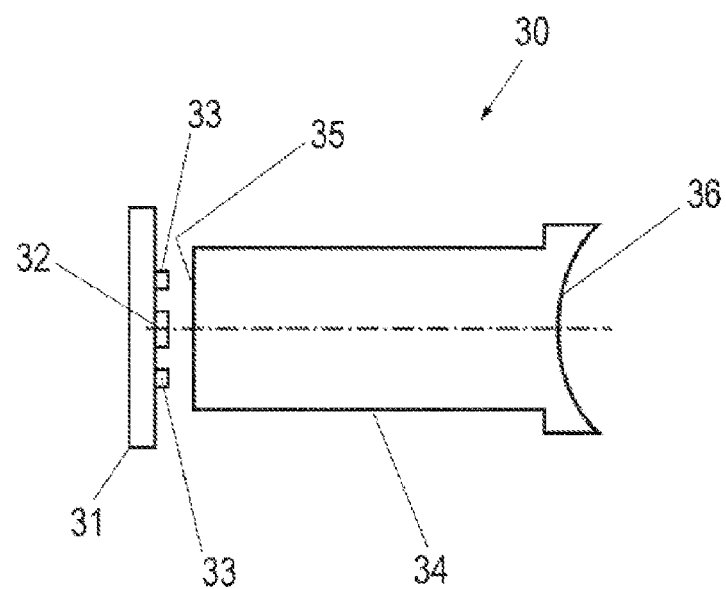
FIG. 3 is a schematic side view of a data transmission unit of the device of FIG. 1.
Figure 4:
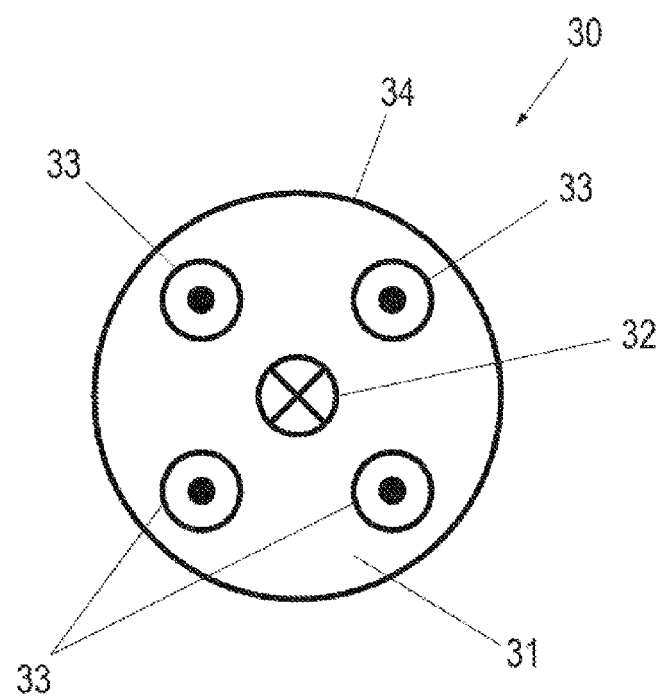
FIG. 4 is an end view of the data transmission unit of FIG. 3.

FIG. 3 schematically shows such a data transmission unit 30 in a section along the z-direction. FIG. 4 shows a plan view of the data transmission unit 30, viewed from the z-direction.

The data transmission unit 30 has a carrier board 31, on which a transmitting element 32 is centrally arranged. The transmitting element 32 is laterally surrounded by several receiving elements 33, in this case four. A laser diode or a light emitting diode can preferably be used as transmitting element 32. The receiving elements 33 are preferably photodiodes or phototransistors. The carrier board 31 can be a separate circuit board for these elements, or a section on the aforementioned circuit board 20 or 20', on which the electronic components 21, 21' for contactless energy transmission are also arranged.

In addition to the electro-optical elements arranged on the carrier board 31, further components are provided in the primary or secondary portions 1, 1' for driving the transmitting element 32 or for evaluating the signals of the receiving elements 33. Data transmission rates of more than 20 MBit per second have already been achieved in tests, so that data can be transmitted without any issues in accordance with the fieldbus protocols commonly used in automation technology.

In the direction of the air gap 6, a cylindrical light-conducting element 34 is axially arranged with the transmitting element 32 in front of the transmitting or receiving elements. The light-conducting element 34 has a first light entry or exit surface 35 facing the carrier board 31 and a second light entry or exit surface 36 facing the air gap 6. The light-conducting element 34 is made of a material that is transparent to the wavelength of the light used, preferably a plastic or quartz material. The diameter preferably ranges from 6 to 10 mm. This is small enough to fit into the installation space available in the area of the inner dome 13, 13' of the ferrite core 11, 11'. On the other hand, this dimension is large enough to allow data transmission even if the primary or secondary portion 1, 1' is not optimally positioned or aligned.

In the example shown, the first light entry and exit surface 35 is planar and the second light entry and exit surface 36 is concave. This combination results in a transmission that is particularly tolerant with respect to a lateral offset (i.e., in x and/or y direction) and a distance variation (in z direction) between primary portion 1 and secondary portion 1'. In particular, a distance variation of $0 < z_0 < 5$ mm and a lateral shift of −2 mm to 2 mm in x- and/or y-direction does not lead to a significant deterioration of the data transmission rate. This is also independent of a rotation from primary portion 1 to secondary portion 1 around the z-axis and against a tilting against each other by up to +/−3°.

Figure 5A:
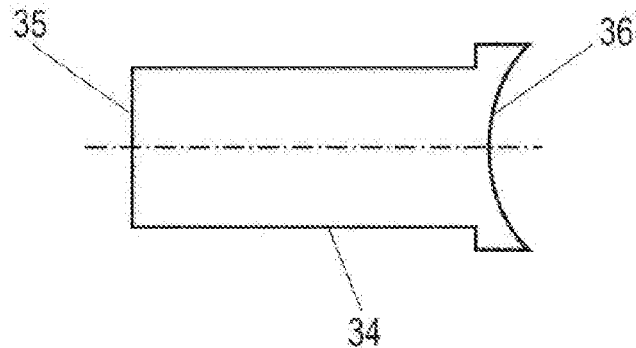
FIGS. 5a and 5b are side views of alternate configurations of a light conducting element of the data transmission unit of FIG. 3.
Figure 5B:
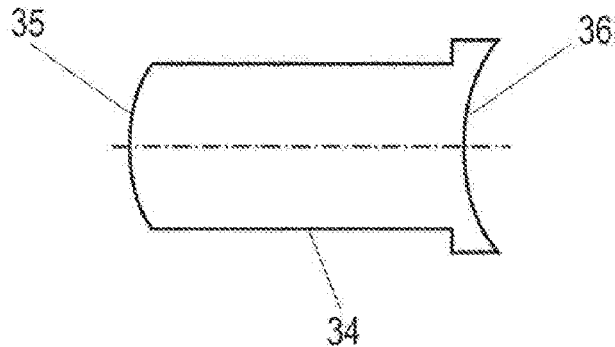

FIGS. 5*a* and 5*b* shows two different possible configurations of the light-conducting element 34, each in a section displayed along the z-axis.

FIG. 5*a* shows the light-conducting element 34, which is also shown in FIGS. 3 and 4.

FIG. 5*b* shows a light-conducting element 34 which is comparable in terms of its basic structure, but with differently shaped light entry and exit surfaces 35, 36. Specifically, the light-conducting element 34 shown in FIG. 5*b* has a convex first light entry and exit surface 35 and a concave second light entry and exit surface 36.

Figure 6:
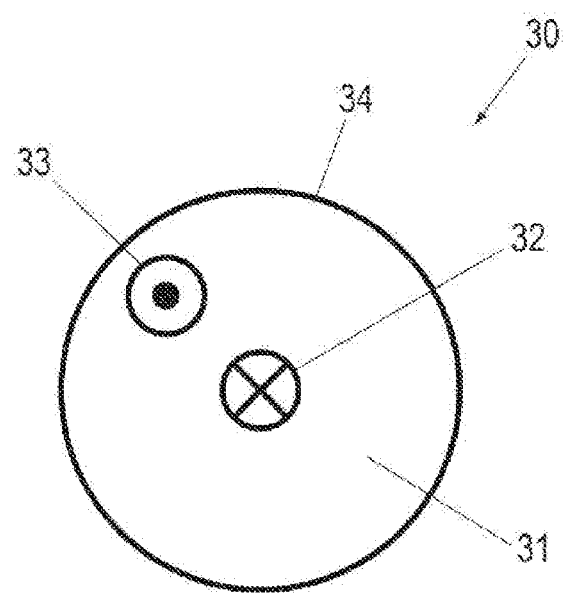
FIG. 6 is an end view of an alternate configuration of a data transmission unit.

Similar to FIG. 4, FIG. 6 shows an alternative embodiment of a data transmission unit 30 in an end view as viewed from the z-direction. As in the embodiment in FIG. 4, the transmitting element 32 is centrally arranged. In contrast to the embodiment in FIG. 4, there are not several receiving elements 33 arranged around the transmitting element 32, but only one receiving element 33. Due to the transmission properties of the light-conducting element 34, a receiving element 33 arranged eccentrically from the transmitting element 32 is sufficient even if the primary portion 1 and the secondary portion 1' are not positioned exactly centrally to each other and, if applicable, are slightly tilted towards each other.

Figure 7:
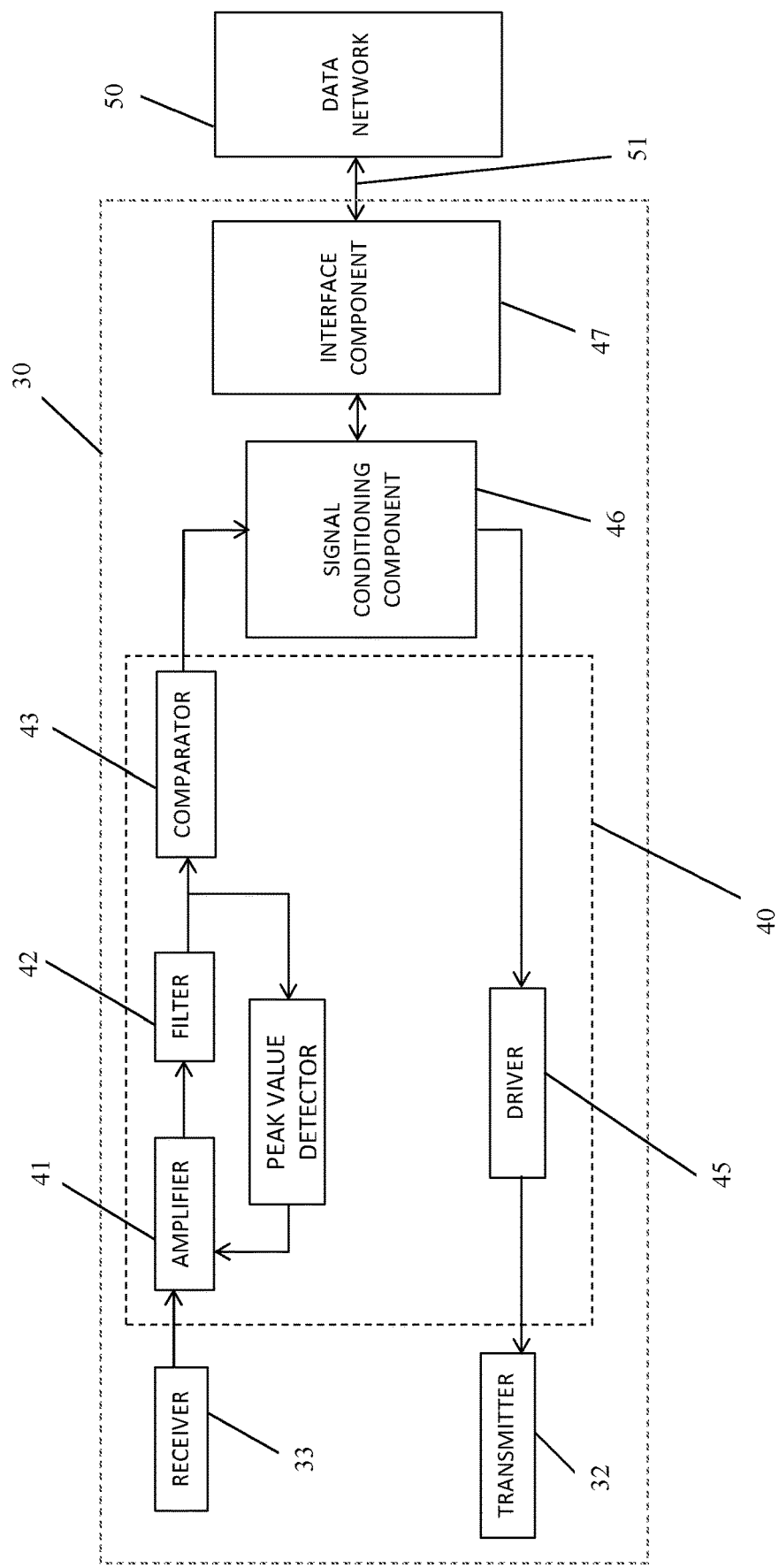
FIG. 7 is a block diagram of the data transmission unit of FIG. 3.

FIG. 7 shows a block diagram illustrating the function of the data transmission unit 30. While FIG. 3 focuses on the optical section of data transmission, FIG. 7 focuses on the electronic section of data transmission.

The electronic components of the data transmission unit 30 are also preferably located directly on the carrier board 31 as close as possible to the transmitter element 32 or receiver element 33 in order to minimize interference.

Signal conditioner 40 is directly coupled to the transmitting element 32 or the receiving element 33. In the receiving branch, this includes an amplifier 41 connected to the receiving element 33, the output of which is fed to a comparator 43 via a filter 42, in particular a high-pass filter. The comparator 43 digitizes the previously analog signal and transmits it for farther conditioning.

Optionally, the signal delivered at the output of filter 42 is fed to a peak value detector 44, which determines a temporary peak value of the signal height by way of a sliding viewing window and sets a gain of the amplifier 41 depending on the determined peak value. In this way, a level adjustment is realized and the gain for the received signal is adjusted to an optimal value, so that, at the output of filter 42, an easily digitizable signal is available, with a constant signal height, which is largely independent of the quality of the signal received at receiving element 33.

With regard to the transmission channel, signal conditioner 40 includes a driver 45 that controls the transmitting element 32.

Signal conditioner 40 is preceded by a signal conditioning component 46, which is connected to an interface component 47. The interface component 47 is used for coupling to a data network 50 via a data line 51.

The data arriving at the data transmission unit 30 via the data network 50, for example, a fieldbus, are received by the interface component 47. The signal conditioning component 46 generates a suitable binary data frame, which is then output via signal conditioner 40 and transmission element 32. Conversely, signals received from the receiving element 33 are converted into a binary signal in the comparator 43, which is then sent to the data network 50 via the signal conditioning component 46 and the interface component 47.

While the preferred forms and embodiments of the invention have been illustrated and described, it will be apparent to those of ordinary skill in the art that various changes and modifications may be made without deviating from the inventive concepts set forth above.

The invention claimed is:

1. A device for contactless inductive energy transmission, comprising
   (a) a primary portion including a coil and a data transmission unit;
   (b) a secondary portion including a coil and a data transmission unit, said secondary coil being inductively coupled via an air gap with said primary coil to transmit energy from said primary portion to said secondary portion, said primary data transmission unit and said secondary transmission unit transmitting data via said air gap, and
   wherein each data transmission unit includes at least one transmitting element, at least one receiving element, and a light-conducting element having a cylindrical configuration and a first light entry or exit surface having a planar configuration facing said transmitting and receiving elements, respectively, and a second light entry or exit surface having a concave configuration facing said air gap.

2. The device of claim 1, in which data is transmitted optically via said air, gap.

3. The device of claim 1, wherein each of said primary data transmission unit and said secondary unit are centrally and concentrically arranged relative to said primary and secondary coils, respectively.

4. The device of claim 2, Wherein each data transmission unit includes a central transmitting element surrounded by a plurality of receiving elements.

5. A method for operating a contactless inductive energy transmission device for transmitting energy from a coil of a primary portion to a coil of a secondary portion via an air gap, wherein during the inductive energy transmission from the primary portion to the secondary portion, optical transmission of data takes place between the primary portion and the secondary portion via the air gap via data transmission units which are integrated in the primary portion and the secondary portion, and wherein each data transmission unit includes at least one transmitting element, at least one receiving element, and a light-conducting element having a cylindrical configuration and a first light entry or exit surface having a planar configuration facing said transmitting and receiving elements, respectively, and a second light entry or exit surface having a concave configuration facing said air gap.

6. The method of claim 5, wherein the transmission of data takes place bi-directionally in a half or full duplex procedure.

* * * * *